United States Patent Office 3,294,729
Patented Dec. 27, 1966

3,294,729
INCREASING THE VISCOSITY OF POLYMERIC N-VINYL LACTAMS BY ADDING $N_2H_4$ AND $H_2O_2$
Eugene V. Hort, Edison, and Frederick Grosser, Midland Park, N.J., assignors to General Aniline & Film Corporation, New York, N.Y., a corporation of Delaware
No Drawing. Filed Sept. 18, 1963, Ser. No. 309,848
8 Claims. (Cl. 260—29.6)

This invention relates to the process of increasing the viscosity of polymeric N-vinyl lactams by cross-linking an aqueous solution or aqueous emulsion of said polymer with hydrazine and hydrogen peroxide.

We have found that hydrazine and hydrogen peroxide in proper combination will cross-link polymeric N-vinyl lactams to any desired extent. In view of this finding, the viscosity of polymeric N-vinyl lactams is readily increased by treating either an aqueous solution or an aqueous emulsion of any homopolymer or copolymer of an N-vinyl lactam with hydrazine and hydrogen peroxide at a temperature ranging from the freezing point to the boiling point of said solution or emulsion. For convenience, however, we prefer a temperature from ambient up to 80° C. For optimum conditions, the hydrazine is in the ratio of 1 mole to 2 moles of hydrogen peroxide, or approximately 1 to 2.13 parts by weight on a 100% pure basis. It is to be noted that cross-linking will take place very well with an excess of hydrogen peroxide and moderately well with an excess of hydrazine.

In the practice of our invention, we have found that the viscosity of the polymeric N-vinyl lactam may be varied in a continuous fashion by using various amounts of the hydrazine-hydrogen peroxide reactant, i.e., cross-linking agent. This variation extends from the almost immeasurable viscosity increase brought about by a 0.01% of the hydrazine-hydrogen peroxide reactant up to thick gels. Lower viscosity polymers require more cross-linking agents to form gels, while higher viscosity polymers will gel with a smaller amount of cross-linking agent.

The concentration of the polymer solution or emulsion is not critical, but at low concentration such as from 1 to 5%, more of the hydrazine-hydrogen peroxide reactant is required. Gels can be readily prepared with less than 1% polymer concentration and an increase in viscosity can be obtained from a solution or emulsion of polymer having a concentration as low as 0.1% polymer.

The hydrazine and the hydrogen peroxide may be employed at any concentration so long as the foregoing ratios are maintained. The only precaution to be observed is that the hydrazine and the hydrogen peroxide should not be mixed with each other, but added separately to the polymer solution or emulsion. In other words, it makes no difference whether the hydrazine is added first followed by the hydrogen peroxide or the latter followed by the former.

The polymeric N-vinyl lactams which may be cross-linked in accordance with the present invention include homopolymers of such N-vinyl lactams and copolymers thereof obtained by copolymerizing an N-vinyl lactam with any monomer containing a polymerizable vinyl group. Most of the homopolymers are soluble in water. The copolymers are also soluble in water provided the proportion of the N-vinyl lactam in the copolymer is high enough. Insoluble copolymers may still be cross-linked when in the form of aqueous emulsions.

As examples of N-vinyl lactams which may be homopolymerized or copolymerized with various monomers having a polymerizable vinyl group; the following are illustrative:

N-vinyl-2-pyrrolidone
3-methyl-N-vinyl-2-pyrrolidone
3-ethyl-N-vinyl-2-pyrrolidone
4-methyl-N-vinyl-2-pyrrolidone
4-ethyl-N-vinyl-2-pyrrolidone
5-methyl-N-vinyl-2-pyrrolidone
5-ethyl-N-vinyl-2-pyrrolidone The homopolymers are readily prepared by the procedural steps given in United States Patents 2,265,450, 2,317,804 and 2,335,454 and in which working examples of most of the above species are given. Viscosity measurements are used as an indication of the mean molecular weight of the homopolymers. The viscosity coefficient K, which is a function of the mean molecular weight as derived by H. Fikentscher, is fully described in Modern Plastics, 23, No. 3, 157–61, 212, 214, 216 and 218 (1945), and in Cellulosechemie 13, 58 (1932). The K values are reported as 1,000 times the calculated viscosity coefficient in order to avoid the use of decimals.

The various monomers containing a polymerizable vinyl group which may be copolymerized with the foregoing N-vinyl lactams in the conventional manner to yield copolymers which may be cross-linked in accordance with the present invention include N-vinyl oxazolidone, N-vinyl imidazolone, N-vinyl-3-morpholinone; vinyl acetate, vinyl methoxyacetate, vinyl diethylacetate, vinyl trimethylacetate, vinyl propionate, vinyl isobutyrate, vinyl butyrate, vinyl acrylate, vinyl methacrylate, vinyl lactate, vinyl caproate, vinyl caproylate, vinyl stearate, etc. Acrylic and methacrylic monomers such as methyl methacrylate, cyclohexyl methacrylate, isobutyl methacrylate, isoamyl methacrylate, $\beta$-methoxyethyl methacrylate and $\alpha$ - (o - chlorophenyl)ethyl methacrylate, $\beta$-phenoxyethyl methacrylate, $\beta$-phenylethyl methacrylate, phenyl methacrylate, o-cresyl methacrylate, p-cyclohexylphenyl methacrylate, 2-nitro-2-methylpropyl methacrylate, diethylaminoethyl methacrylate, ethylidene acetate methacrylate and glycidyl methacrylate, including esters of haloacrylic acids, such as methyl-a-chloroacrylate, ethyl-a-chloroacrylate, phenyl-$\alpha$-chloroacrylate, a-ethylacrylic acid, methyl acrylate, propyl acrylate, acrylic acid, methacrylic acid, etc., acrylonitrile, methacrylonitrile, acrylamide, methacrylamide, as well as N-alkyl and N-aryl substituted acrylamides, monomers of vinyl alkyl and aryl ethers, such as methyl vinyl ether, ethyl vinyl ether, isopropyl vinyl ether, n-butyl vinyl ether, isobutyl vinyl ether, 2-ethylhexyl vinyl ether, vinyl 2-methoxyethyl ether, vinyl 2-chloroethyl ether, vinyl phenyl ether, $\alpha$-chlorovinyl phenyl ether, $\alpha$-bromovinyl phenyl ether, $\alpha$-methylvinyl phenyl ether, $\alpha$-phenylvinyl phenyl ether, vinyl o-cresyl ether, vinyl m-cresyl ether, vinyl p-cresyl ether, $\alpha$-methylvinyl p-cresyl ether, vinyl o-ethylphenyl ether, vinyl p-chlorophenyl ether, vinyl 2,4-dichlorophenyl ether, vinyl 2,4,6-trichlorophenyl ether, vinyl m-hydroxyphenyl ether, vinyl a-naphthyl ether and vinyl $\beta$-naphthyl ether, etc.

The following examples will serve to illustrate how the various polymeric N-vinyl lactams may be cross-linked, i.e. their viscosity increased, in accordance with the present invention. It is to be understood, however, that these examples are merely illustrative and are not to be considered as limitative of the invention disclosed.

*Example I*

A series of seven 20% aqueous solutions of the homopolymer of N-vinyl-2-pyrrolidone having a K value of 31 and prepared from spray-dried powder were treated with various proportions of hydrazine and hydrogen peroxide. Into each solution, the hydrazine (as 54% solution) was added to the homopolymer solution which was heated to 50° C. and the hydrogen peroxide (as 35% solution)

added. The solution was maintained at 50° C. and periodically sampled for viscosity determination. The degree of thickening achieved is shown in the following table:

| Hydrazine Concentration (Percent by weight of polymer) | Mole Ratio | | K-value (A) vs. hrs. at 50° C. | | | |
|---|---|---|---|---|---|---|
| | Hydrazine | Peroxide | 0 | 1 | 2 | 3 |
| 0.5 | 1 | 0.67 | 31.0 | 34.2 | 35.3 | 35.5 |
| 0.5 | 1 | 1.33 | 31.0 | 40.0 | 43.8 | 44.2 |
| 0.5 | 1 | 2.0 | 31.0 | 42.5 | 70.3 | (¹) |
| 0.5 | 1 | 3.33 | 31.0 | 39.9 | 64.5 | (¹) |
| 1.0 | 2 | 0.67 | 31.0 | 31.8 | 31.8 | 31.8 |
| 1.5 | 3 | 0.67 | 31.0 | 31.8 | 31.8 | 31.8 |
| 0.05 | 1 | 2 | 31.0 | 31.3 | 32.0 | 32.2 |

¹ Heavy gel.

It is to be noted that alternately, the polymerization of the N-vinyl lactam alone or copolymerization thereof with any one of the foregoing monomers containing a polymerizable vinyl group can be catalyzed with hydrogen peroxide and hydrazine. The remarkable thickening doesn't occur until nearly all of the N-vinyl lactam has homopolymerized or nearly all of the N-vinyl lactam and the other polymerizable vinyl monomer has copolymerized.

(A) These K-values, are a function of the mean molecular weight as derived by H. Fikentscher, Cellulosechemie 13, 58 (1932).

*Example II*

A series of sixteen aqueous solutions of the homopolymer of N-vinyl-2-pyrrolidone ranging in concentration of from 10.8% to 20.3% by weight and a K-value of 30, 56 and 77 were treated with various proportions by weight of hydrazine as in Example I. Into each solution 2.13 times as much by weight of hydrogen peroxide was used based on the weight of the hydrazine. The degree of thickening achieved is shown in the following table:

| Homopolymer N-vinyl-2-pyrrolidone | | Hydrazine Conc. (Percent by weight of polymer) | K value of Cross-linked homopolymer |
|---|---|---|---|
| Conc., percent | K-value | | |
| 19.4 | 30 | 0.052 | 32.2 |
| 19.4 | 30 | 0.104 | 37.1 |
| 19.4 | 30 | 0.156 | 39.0 |
| 19.4 | 30 | 0.208 | 42.5 |
| 19.4 | 30 | 0.260 | 54.4 |
| 19.4 | 30 | 0.312 | 63.8 |
| 19.4 | 30 | 0.364 | 64.3 |
| 19.4 | 30 | 0.780 | Gel |
| 19.4 | 30 | 1.560 | Gel |
| 20.3 | 56 | 0.052 | 59.4 |
| 20.3 | 56 | 0.104 | 64.5 |
| 20.3 | 56 | 0.156 | 78.2 |
| 20.3 | 56 | 0.208 | 91.3 |
| 10.8 | 77 | 0.052 | 87.2 |
| 10.8 | 77 | 0.104 | 124.8 |
| 10.8 | 77 | 0.156 | Gel |

*Example III*

To 500 grams of a 4% aqueous solution of a copolymer prepared from 1 part by weight of N-vinyl-2-pyrrolidone and 3 parts by weight of acrylamide there were added 6 grams of 35% hydrogen peroxide followed by 1.9 grams of 52% hydrazine.

The solution bubbled slightly and became very viscous.

|  | Cps.* |
|---|---|
| Initial viscosity | 819 |
| Viscosity after 5 hours at room temp | 7260 |

*The viscosity was measured with a Brookfield Synchro-Electric viscosimeter, Model LVF.

*Example IV*

To 200 grams of a 40% aqueous emulsion of a copolymer prepared from 1 part by weight of N-vinyl-2-pyrrolidone and 3 parts by weight of vinyl acetate there were added 12 grams of 35% hydrogen peroxide followed by 3.8 grams of 52% hydrazine.

The emulsion which had an initial viscosity of 1200 cps. foamed slowly at room temperature and formed a gel overnight.

A dried sample of the original emulsion had a K-value of 44.6 in 95% ethanol. The cross-linked polymer was insoluble in 95% ethanol.

The properties of the polymer change with the degree of cross-linking.

Moderately cross-linked polymers retain their solubility in the solvents in which they were previously soluble and become useful as thickeners, protective colloids, and flocculants.

More heavily cross-linked polymers swell greatly but do not dissolve in any non-destructive solvents. These are particularly useful to absorb various solutions. For example, a gel swollen with aqueous mineral acid has proven useful in oil well acidizing.

Still more heavily cross-linked polymers become mechanically stronger and swell less. These are particularly useful in removing traces of materials such as tannins or phenols (which complex with PVP) from various solutions.

We claim:

1. The process of increasing the viscosity of polymeric N-vinyl lactams which consists of treating a polymeric N-vinyl lactam in the form of aqueous solution with hydrazine and hydrogen peroxide added separately to said polymeric lactam in approximately the mole ratio of at least 2 of hydrogen peroxide to 1 of hydrazine.

2. The process of increasing the viscosity of polymeric N-vinyl lactams which consists of treating a polymeric N-vinyl lactam in the form of aqueous emulsion with hydrazine and hydrogen peroxide added separately to said polymeric lactam in approximately the mole ratio of at least 2 of hydrogen peroxide to 1 of hydrazine.

3. The process of increasing the viscosity of the homopolymer of N-vinyl-2-pyrrolidone which consists of treating said homopolymer in the form of aqueous emulsion with hydrazine and hydrogen peroxide added separately to said homopolymer in approximately the mole ratio of at least 2 of hydrogen peroxide to 1 of hydrazine.

4. The process of increasing the viscosity of an aqueous solution of the homopolymer of N-vinyl-2-pyrrolidone which consists of treating said solution with hydrazine and hydrogen peroxide added separately to said solution in approximately the mole ratio of at least 2 of hydrogen peroxide to 1 of hydrazine.

5. The process of increasing the viscosity of an aqueous emulsion of the copolymer of N-vinyl lactam and vinyl acetate which consists of treating said emulsion with hydrazine and hydrogen peroxide added separately to said emulsion in approximately the mole ratio of at least 2 of hydrogen peroxide to 1 of hydrazine.

6. The process of increasing the viscosity of an aqueous solution of the copolymer of N-vinyl lactam and acrylamide which consists of treating said solution with hydrazine and hydrogen peroxide added separately to said solution in approximately the mole ratio of at least 2 of hydrogen peroxide to 1 of hydrazine.

7. The process of increasing the viscosity of an aqueous solution of the homopolymer of N-vinyl-2-piperidone which consists of treating said solution with hydrazine and hydrogen peroxide added separately to said solution in approximately the mole ratio of at least 2 of hydrogen peroxide to 1 of hydrazine.

8. The process of increasing the viscosity of an aqueous solution of the homopolymer of 5-methyl-N-vinyl-2-pyrrolidone which consists of treating said solution with hydrazine and hydrogen peroxide added separately to said solution in approximately the mole ratio of at least 2 of hydrogen peroxide to 1 of hydrazine.

References Cited by the Examiner

UNITED STATES PATENTS 2,821,519   1/1958   Glickman _____ 260—88.3
2,927,913   3/1960   Grosser _____ 260—88.4

OTHER REFERENCES

Inorganic Chemistry, Moeller, John Wiley & Sons, New York, 1952, pp. 352–3.

MURRAY TILLMAN, *Primary Examiner.*

SAMUEL H. BLECH, *Examiner.*

P. LIEBERMAN, *Assistant Examiner.*